(12) United States Patent
Shamma et al.

(10) Patent No.: US 10,695,915 B2
(45) Date of Patent: Jun. 30, 2020

(54) GRIPPER MECHANISM AND METHOD

(71) Applicant: KING ABDULLAH UNIVERSITY OF SCIENCE AND TECHNOLOGY, Thuwal (SA)

(72) Inventors: Jeff S. Shamma, Thuwal (SA); Mohammad Z. Shaqura, Thuwal (SA); Samet Guler, Thuwal (SA); Mohammed Algarni, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/255,092

(22) Filed: Jan. 23, 2019

(65) Prior Publication Data
US 2019/0263004 A1    Aug. 29, 2019

Related U.S. Application Data

(60) Provisional application No. 62/635,084, filed on Feb. 26, 2018.

(51) Int. Cl.
*B25J 15/02* (2006.01)
*B25J 13/08* (2006.01)
*B25J 9/00* (2006.01)

(52) U.S. Cl.
CPC .......... *B25J 15/026* (2013.01); *B25J 9/0009* (2013.01); *B25J 13/085* (2013.01)

(58) Field of Classification Search
CPC .............. B25J 15/0028; B25J 15/0033; B25J 15/0038; B25J 15/0052; B25J 15/0213; B25J 15/026; B25J 9/009; B25J 9/0009; B25J 13/085

USPC ...... 294/86.4, 101, 103.1, 113, 119.1, 82.23, 294/82.34
See application file for complete search history.

(56) References Cited

U.S. PATENT DOCUMENTS

| | | | | |
|---|---|---|---|---|
| 4,647,099 A | * | 3/1987 | Berry | E21B 17/16 294/103.1 |
| 4,743,055 A | * | 5/1988 | Dantan | B25J 15/103 294/110.1 |
| 5,671,961 A | * | 9/1997 | Buck | B25B 5/147 294/116 |
| 5,873,615 A | * | 2/1999 | McCullough | B66C 3/16 294/106 |
| 6,167,322 A | * | 12/2000 | Holbrooks | H01L 21/67259 294/103.1 |

(Continued)

OTHER PUBLICATIONS

Chen, F., et al., "In-Hand Precise Twisting and Positioning by a Novel Dexterous Robotic Gripper for Industrial High-Speed Assembly," IEEE International Conference on Robotics and Automation (ICRA), May 31-Jun. 7, 2014, pp. 270-275, IEEE.

(Continued)

*Primary Examiner* — Dean J Kramer
(74) *Attorney, Agent, or Firm* — Patent Portfolio Builders PLLC (57) ABSTRACT

A gripper mechanism for gripping a load, the gripper mechanism including a body, a first actuator mechanism attached to the body and configured to linearly move a first gripping device; and a second actuator mechanism attached to the body and configured to rotate a second gripping device. A translation of the first gripping device and a rotation of the second gripping device result in gripping the load.

20 Claims, 8 Drawing Sheets

(56) References Cited

U.S. PATENT DOCUMENTS

| | | | | |
|---|---|---|---|---|
| 7,370,896 | B2* | 5/2008 | Anderson | B25J 15/0009 294/106 |
| 7,887,108 | B1* | 2/2011 | Cawley | B25J 15/022 294/106 |
| 7,905,529 | B2* | 3/2011 | Reed | E21B 19/06 294/103.1 |
| 8,317,241 | B2* | 11/2012 | Ehnes | B25J 9/142 294/192 |

OTHER PUBLICATIONS

Correll, N., et al., "Analysis and Observations from the First Amazon Picking Challenge," IEEE Transactions on Automation Science and Engineering (T-ASE), Sep. 22, 2017, arXiv:1601.05484v3 [cs.RO].

Eppner, C., et al., "Lessons from the Amazon Picking Challenge: Four Aspects of Building Robotic Systems," Proceedings of Robotics: Science and Systems, Ann Arbor, Michigan, Jun. 2016.

Hamburg, E., et al., "Soft Shape-Adaptive Gripping Device Made from Artificial Muscle," Proceedings of SPIE, Smart-Structures and Materials Nondestructive Evaluation and Health Monitoring, International Society for Optics and Photonics, Apr. 15, 2016, vol. 9798, pp. 97981Q-1-97981Q-7.

Ma, R.R., et al., "A Modular, Open-Source 3D Printed Underactuated Hand," IEEE International Conference on Robotics and Automation (ICRA), May 6-10, 2013, pp. 2737-2743, IEEE.

Maruyama, R., et al., "Delicate Grasping by Robotic Gripper with Incompressible Fluid-Based Deformable Fingertips," IEEE/RSJ International Conference on Intelligent Robots and Systems (IROS), Nov. 3-7, 2013, pp. 5469-5474, IEEE.

Peer, A., et al., "Multi-Fingered Telemanipulation Mapping of a Human Hand to a Three Finger Gripper," The 17th IEEE International Symposium on Robot and Human Interactive Communication, Aug. 15, 2008, pp. 465-470, IEEE.

Petkovicć, D. et al., "Analyzing of Flexible Gripper by Computational Intelligence Approach," Mechatronics, Dec. 2016, vol. 40, pp. 1-16.

Quigley, M., et al., "ROS: An Open-Source Robot Operating System," In ICRA workshop on open source software, Jun. 29, 2009, vol. 3, No. 31, p. 5.

Roy, D., "Development of Novel Magnetic Grippers for Use in Unstructured Robotic Workspace," Robotics and Computer-Integrated Manufacturing, Oct. 1, 2015, vol. 35, pp. 16-41.

Seguna, C.M., et al., "The Mechanical and Control System Design of a Dexterous Robotic Gripper," The 8th IEEE International Conference on Electronics, Circuits and Systems, Sep. 2001, vol. 3, pp. 1195-1201, IEEE.

Sintov, A., et al., "A Gripper Design Algorithm for Grasping a Set of Parts in Manufacturing Lines," Mechanism and Machine Theory, Nov. 2016, vol. 105, pp. 1-30.

Song, S., et al., "GeckoGripper: A Soft, Inflatable Robotic Gripper Using Gecko-Inspired Elastomer Micro-Fiber Adhesives," IEEE/RSJ International Conference on Intelligent Robots and Systems (IROS 2014), Sep. 14-18, 2014, pp. 4624-4629, IEEE.

Tlegenov, Y., et al., "An Open-Source 3D Printed Underactuated Robotic Gripper," IEEE/ASME 10th International Conference on Mechatronic and Embedded Systems and Applications (MESA), Sep. 10-12, 2014, pp. 1-6, IEEE.

Udupa, G., et al., "Robotic Gripper Driven by Flexible Microactuator Based on an Innovative Technique," IEEE Workshop on Advanced Robotics and its Social Impacts (ARSO), Oct. 26-28, 2010, pp. 111-116, IEEE.

Vittor, T., et al., "A Flexible Robotic Gripper for Automation of Assembly Tasks: A Technology Study on a Gripper for Operation in Shared Human Environments," IEEE International Symposium on Assembly and Manufacturing (ISAM), May 25-27, 2011, pp. 1-6, IEEE.

Zaki, A.M., et al., "Design and Implementation of Efficient Intelligent Robotic Gripper," The 2010 International Conference on Modelling, Identification and Control (ICMIC), Jul. 17-19, 2010, pp. 710-716, IEEE.

* cited by examiner

GRIPPER MECHANISM AND METHOD

CROSS-REFERENCE TO RELATED APPLICATIONS

This application claims priority to U.S. Provisional Patent Application No. 62/635,084, filed on Feb. 26, 2018, entitled "GRIPPER MECHANISM AND METHOD," the disclosure of which is incorporated herein by reference in its entirety.

BACKGROUND

Technical Field

Embodiments of the subject matter disclosed herein generally relate to a gripper mechanism for grasping an object, and more specifically, to methods and systems for grasping the object with a narrow operating clearance.

Discussion of the Background

Robotic grippers have been an active research field over the last decades due to their applications in industrial robotics, medical fields, remote exploration, humanoid robotics research and several other areas. Tens of robotic manipulators can be found in a single assembly line in today's modern factories. Custom designed robots are utilized to perform tasks that are difficult for human workers because these tasks involve working with large and/or heavy parts or they are dangerous to humans. Efficiency and manufacturing consistency are main incentives for deploying industrial automation systems.

Robotic manipulators are characterized by the number of degrees of freedom (DOF), operating space and maximum payload, in addition to some other power and software system requirements. A part of the manipulator is the end effector element (the robotic gripper mechanism), which can be embedded into the manipulator's design or can be externally attached for more generic designs. For applications that involve well defined tasks, such as welding or painting in factories assembly lines, the first type is usually used. However, tasks that require higher modularity utilizes manipulators that can use various end effector elements (the robotic gripper is such an effector element).

Human hands are resilient and can perform multitasking, for instance, grasping objects with different geometries, surface friction and weight distribution. Sintov presents a gripper design process for picking and placing objects of different geometry by proposing an algorithm that analyzes the geometry of an object and builds a library of best grasping points utilizing a 3-fingered robotic gripper. Multi-finger grippers can simulate human grasping, especially if they are coupled with force/torque feedback or tactile accurate sensing. However, this approach usually comes with the cost of controlling a higher number of actuators and sensor data processing, which increases the size and weight of the gripper, and makes the control task more challenging.

Other designs target specific operational requirements rather than mimicking the structure of human hands. These designs prove effectiveness for their target tasks like object picking. A two plates intelligent design is presented in Zaki for picking objects with simple geometry. A magnetic gripper design and development that lifts metal objects in an unstructured environment is presented in Debanik. Mechanically adaptive two sided robotic gripper designs are presented in Timothy and Fei, where the concept of compliance is utilized in the design to account for different geometries and secured grip of the objects. Another design to grip fragile or soft objects is developed in Ryoji by deploying deformable fingertips filled with a liquid-gel material. A bio-inspired gripper based on inflatable micro-fiber contact surface is presented in Sukho. The gripping mechanism, when attaching to the object, is controlled by the pressure of the air flowing to the contact surface.

However, none of the above noted designs is capable of grasping an object that has a small clearance to a panel from which is attached, for example, a wrench that hangs vertically from a panel.

Therefore, there is a need for a gripper mechanism that overcomes the above noted problems and also is simple and reliable.

SUMMARY

According to an embodiment, there is a gripper mechanism for gripping a load. The gripper mechanism includes a body, a first actuator mechanism attached to the body and configured to linearly move a first gripping device, and a second actuator mechanism attached to the body and configured to rotate a second gripping device. A translation of the first gripping device and a rotation of the second gripping device result in gripping the load.

According to another embodiment, there is a gripper mechanism for gripping a load, the gripper mechanism including a body having a chamber, the chamber having an opening for receiving the load, a first gripping device located within the chamber, opposite the opening, during an open position, and a second gripping device located inside the body, during the open position. A translation of the first gripping device and a rotation of the second gripping device result in gripping the load during a closed position.

According to still another embodiment, there is a method for gripping a load with a gripper mechanism. The method includes placing a body of the gripper mechanism next to the load so that the load is located inside an opening of a chamber formed in the body; rotatably actuating a first gripping device, located inside the body, to occupy and close the opening; linearly actuating a second gripping device, located within the chamber, opposite the opening, to move toward the load; and gripping the load between the first gripping device and the second gripping device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a gripper mechanism that is capable to grab a wrench that hangs vertically from a panel. However, the embodiments discussed herein are not limited to such arrangement, but they may be used for other objects that show small clearance with a plane.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following embodiments are discussed with regard to the following challenge: design a novel robotic gripper mechanism that can grasp hand-tools available in a conventional workshop, such as, wrenches or other tools that fit vertically in a gripping space. The operating clearance is limited around the tool and a firm grip is desired as the tool is used later by the gripper mechanism to perform a manipulation task that will exert back torque on the tool.

Figure 1:
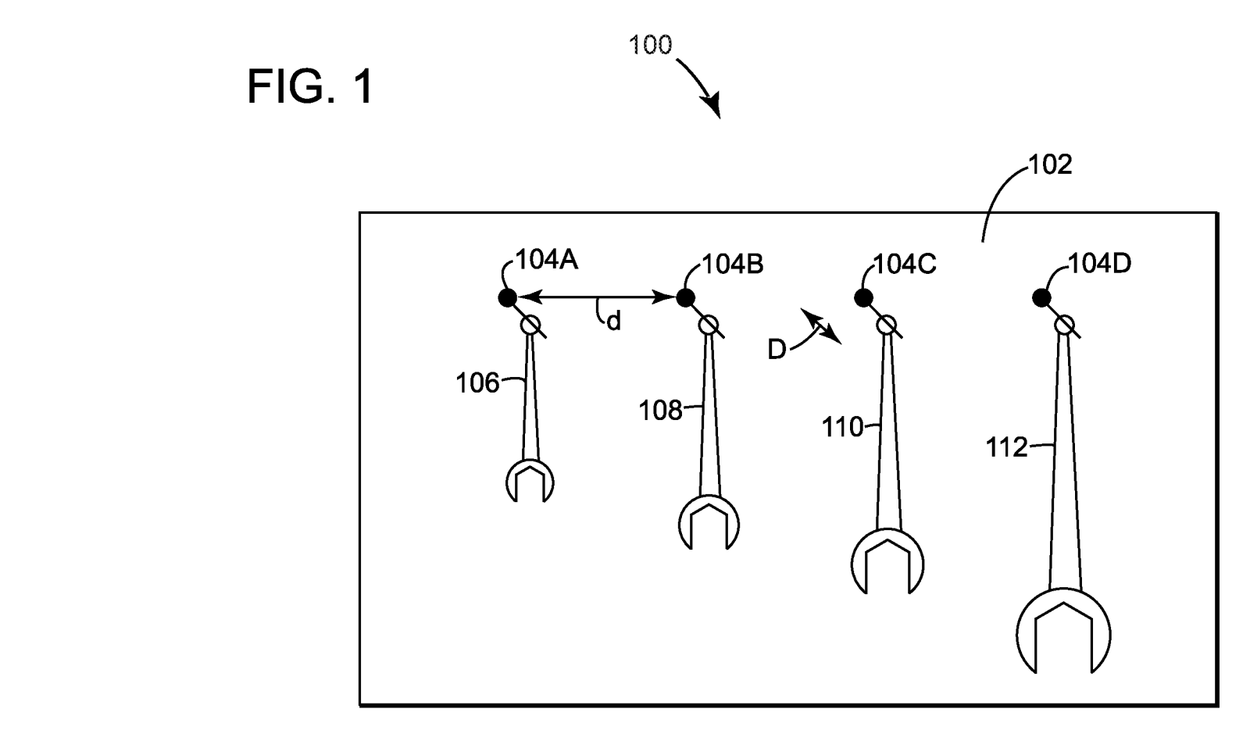
FIG. 1 illustrates a panel that holds vertically plural wrenches.

According to an embodiment, an experimental setup 100 is shown in FIG. 1 and includes a panel (e.g., workshop wooden panel) 102 having four pegs 104A to 104D. A set of 4 standard wrenches 106, 108, 110, and 112 are hanged from the corresponding pegs. The pegs are separated by a given distance d, for example, 5 cm, which leaves a tool clearance margin of only 2.5 cm from the center of each peg. The existing gripper mechanisms with horizontal axis closure mechanisms or multi-fingered bulky grippers are not suitable for this task as collision with neighboring tools can occur. The depth clearance D is another design parameter that can be challenging for most of the existing off-the-shelf robotic grippers because a maximum distance between the gripped object and the panel is about 15 mm. For the scenario illustrated in FIG. 1, this is reflected by the holding peg offset D from the wall of the panel.

Further, the gripper mechanism should be able to deal with variations in the geometry and dimensions of the tools. For the set of wrenches illustrated in FIG. 1, the tools vary in size between 10 and 24 mm and the range of tool heights varies between 140 and 280 mm. These heights do not represent the actual heights of the tools. These heights represent the maximum length that is available for the gripper mechanism for gripping the wrenches, i.e., is the actual height of a wrench minus the lengths of both operating ends of the wrenches. This height that is available to the gripper mechanism for grabbing is called herein the Nick Height and it varies between 85 and 170 mm for the wrenches in consideration. The width of the tool nick and the thickness vary between 12.5-27.5 and 4.5-9 mm respectively. These ranges of heights and thickness pose design challenges as the gripper mechanism should be able to pick any tool. In other words, the new gripper mechanism should be able to grasp any tool of size 10 and 24 with the same performance and reliability. One skilled in the art would understand that the above noted requirements for the gripper mechanism are related to a particular task. However, the gripper mechanism may be adapted for various tasks and thus, these requirements should not be interpreted as limiting the embodiments to be discussed next.

Furthermore, the design specifications may include minimizing the number of degrees of freedom, which simplifies the operation logic and limit power consumption. The gripper mechanism is expected to be a low cost, light weight and easy to implement. Also, the gripper mechanism is expected to be operated autonomously, as part of bigger systems with high efficiency and reliability while meeting one or more of the design requirements discussed above.

Figure 2:
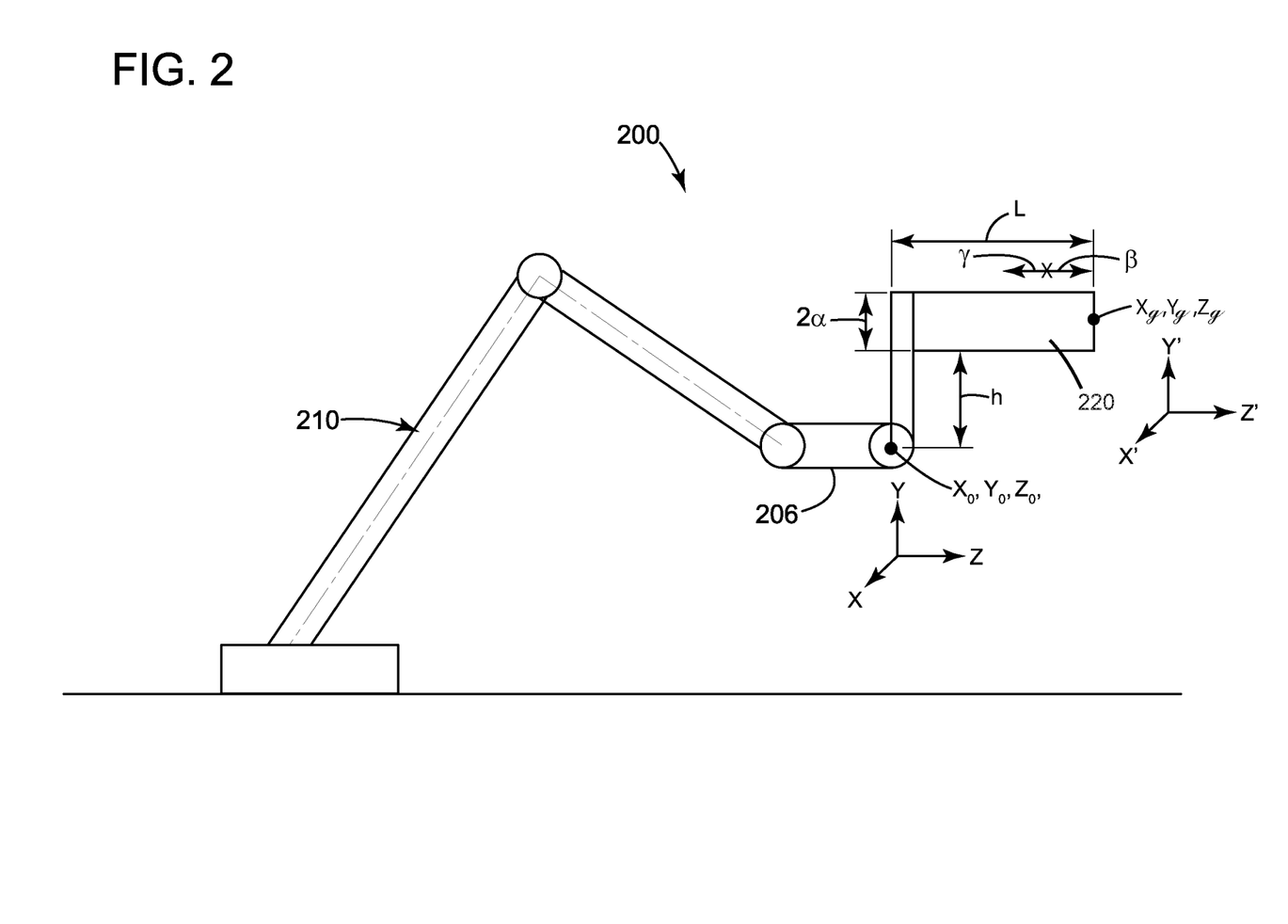
FIG. 2 illustrates a robotic arm having a gripper mechanism.

Such a gripper mechanism is now discussed. A Cartesian coordinate system XYZ is assumed to match the coordinates of a robotic arm 206, to which the gripper mechanism 220 is mounted, as illustrated in FIG. 2. Robotic arm 206 is part of a bigger robot 210. The origin O of this system XYZ coincides with the robotic arm 206 tip point, when the robot is in some default ready position (x0, y0, z0). The X and Y axes are aligned with the global vertical and horizontal translation of the robotic arm 206 and the Z axis is pointing out of the gripper tip point. When the robotic arm is in a ready position, it is assumed that the last joint of the arm is aligned with the Z axis. The gripper mechanism coordinates system X'Y'Z' is similar to the robotic arm, but has a shift in the origin O', along the Z axis, as illustrated in FIG. 2. The end effector origin ($x_g$, $y_g$, $z_g$) is given by:

$$x_g = x_0 \qquad (1)$$
$$y_g = y_0 + h + \alpha,$$
$$z_g = z_0 + L - \beta - \gamma$$

where h is the vertical displacement between the center of the robotic arm 206 and the gripper mount. Choosing h depends on the robot capability and manipulation task, tool length and control strategy. α is the distance in y direction between the edge and the center of the gripper mechanism. This parameter depends on the geometry and orientation of the tools to be grasped. In the wrench example illustrated in FIG. 1, the gripper mechanism needs to effectively grasp tools of lengths 85-170 mm. L is the full gripper mechanism length, which is minimized while prioritizing the minimum width due to clearance constraints along the X-axis. β is the maximum offset between the gripper front edge and the effective grasping region. This maximum offset is chosen based on the clearance constraint between the tool and the panel as seen in FIG. 1. γ is the radius of the biggest circle that can fit inside the grasp region. The size of this circle is another design parameter, the bigger the circle, the bigger the tool width and thickness it can accommodate and the wider the gripper mechanism overall width, which is undesirable according to the requirements.

Figure 3:
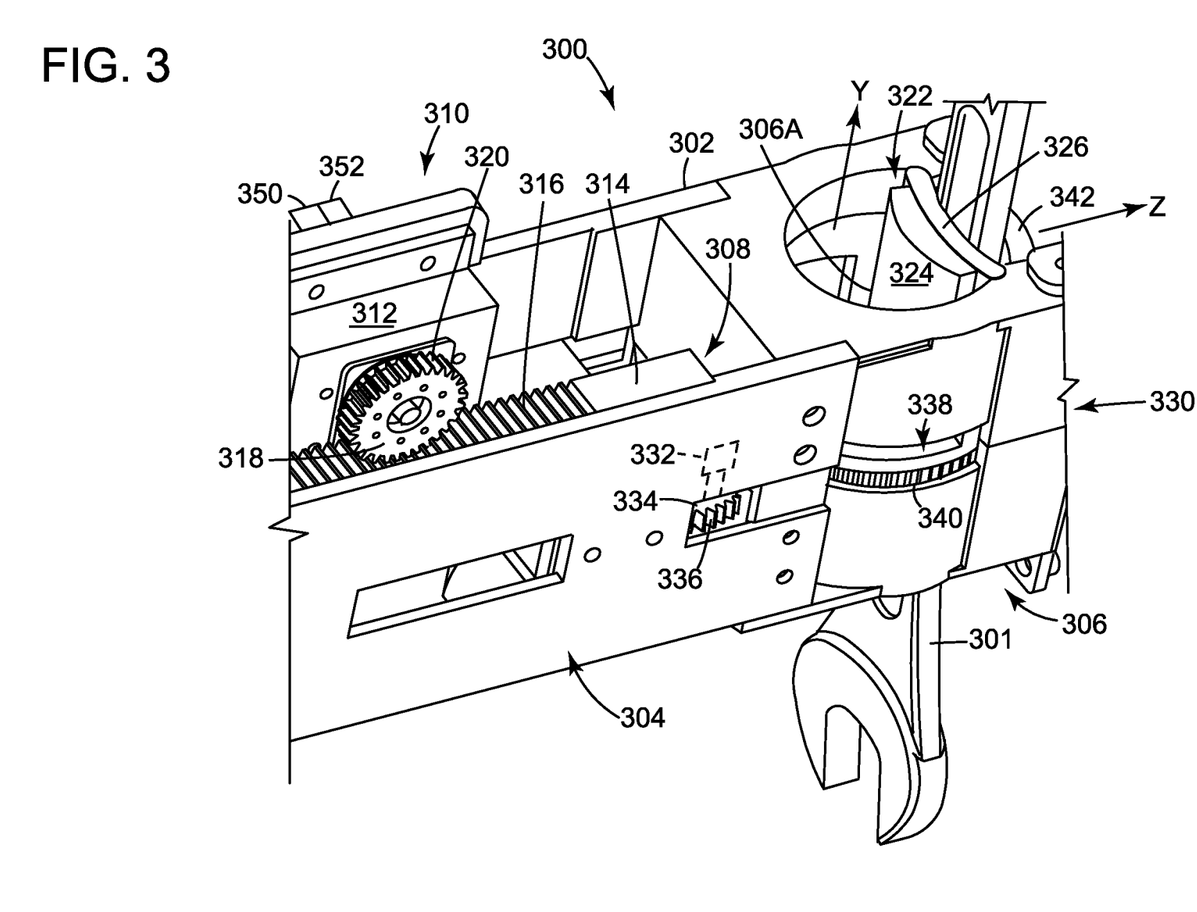
FIG. 3 illustrates a gripper mechanism having a linear moving first gripping device and a rotatably moving second gripping device.

A gripper mechanism 300 is illustrated in FIG. 3 as holding a tool 301. The gripper mechanism 300 has a body 302 including a first frame 304 and a second frame 306. The first and second frames may be attached to each other with screws or other means. In one embodiment, the first and second frames may be integrally formed as a single body.

The first frame 304 is configured to house a first actuator mechanism 310 and the second frame 306 is configured to house a second actuator mechanism 330. The first and second actuator mechanisms are different, e.g., one is linear and the other one is circular. Other types of actuator mechanisms may be used. If the first actuator mechanism 310 is a linear actuator mechanism, it may include a motor 312 that is configured to actuate a linear slider 314. In one application, the linear slider 314 has a plurality of teeth 316 formed on a flat surface of the linear slider, as shown in FIG. 3. Motor 312 is connected to a wheel 318 having its own teeth 320, that mate with the teeth 316 of the linear slider 314. Thus, when a controller 350 (shown in FIG. 3 located on the body 302, but understood by one skilled in the art to be located anywhere on the body or the robotic arm) actuates motor 312, wheel 318 rotates either clockwise or counterclockwise, making the linear slider 314 to move towards or away from the second frame 306.

Second frame 306 has an opening 308 that allows linear slider 314 to move inside a chamber 306A formed in the second frame, as illustrated in FIG. 3. Chamber 306A can be also seen in FIGS. 4A and 4B. In one embodiment, chamber 306A has a cylindrical shape. Linear slider 314 has a first gripping device 322, that may include a first element 324 and a second element 326. The first element 324 may be a strong material, like steel, metal, composite material while the second element 326 may be a material having a high gripping property, e.g., a polymer, plastic. The second element 326 is optional and is designed to ensure a better gripping of the target, i.e., the tool 301 in this case. The second element 326 may be shaped as a curved plate to fits a profile of the target tool. Other shapes may be used.

Figure 4A:
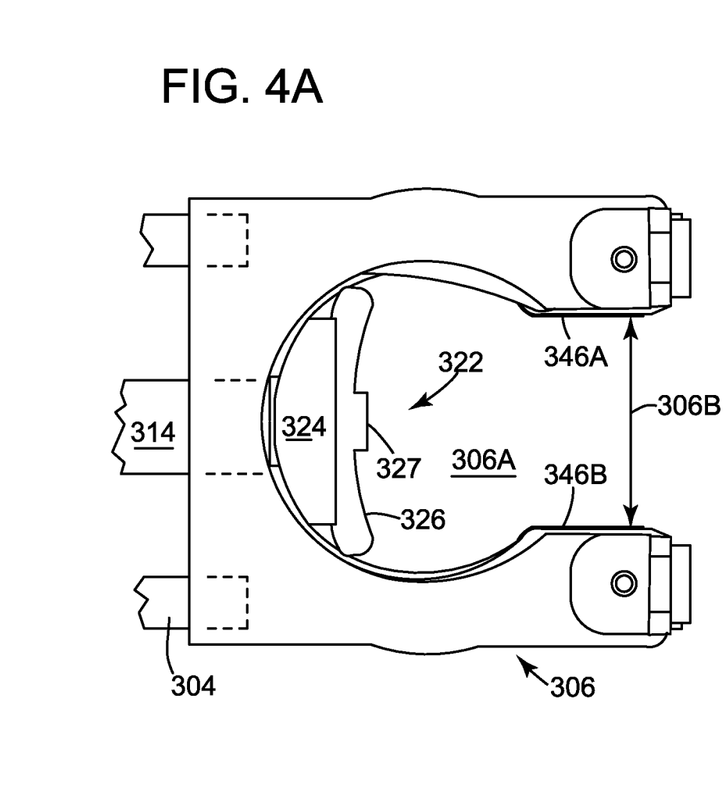
FIG. 4A shows an open position of the gripper mechanism of FIG. 3
Figure 4B:
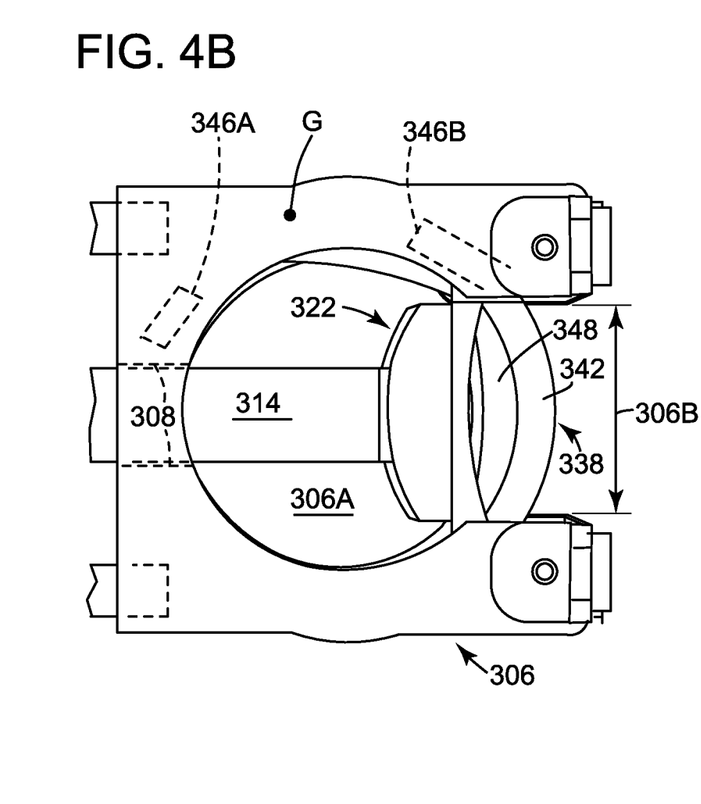
FIG. 4B shows a closed position of the gripper mechanism.

FIG. 4A shows the linear slider 314 in an open position, i.e., the first gripping device 322 is located closest to the first frame 304, within the chamber 306A of the second frame 306 while FIG. 4B shows the linear slider 314 in a closed position, i.e., the first gripping device 322 being located farthest from the first frame 304, still within the chamber 306A of the second frame 306. In other words, the first gripping mechanism 322 is located inside the chamber 306A, opposite an opening 306B of the chamber, during the open position, and the first gripping mechanism 322 moves toward the opening 306B and is located adjacent to the opening during the closed position. During the closed position, a second gripping mechanism 338 closes the opening 306B and directly faces the first gripping mechanism 322, if no tool is present.

Figure 5:
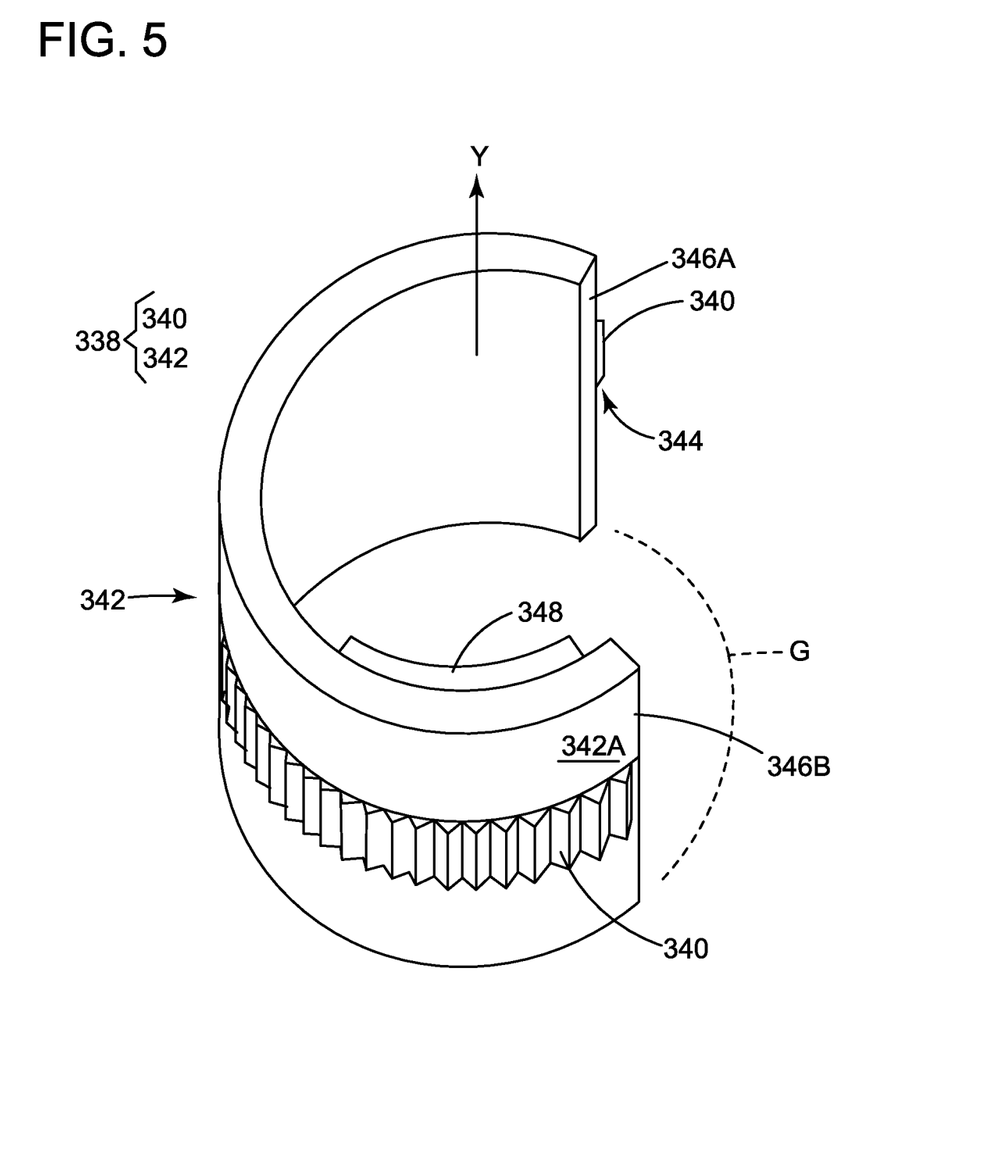
FIG. 5 illustrates the rotatably moving second gripping device.

Returning to FIG. 3, the second actuator mechanism 330 may be attached to the first frame 304 or the second frame 306 and includes a motor 332 connected to a wheel 334 having plural teeth 336. The second gripping device 338 is located inside the second frame 306, as illustrated in FIGS. 3 to 4B, and has its own teeth 340, that mate with the teeth 336 of the wheel 334. The second gripping device 338 includes a cylindrical shell 342, which is illustrated in FIG. 5. Teeth 340 may be formed on an outside face 342A of the cylindrical shell 342 so that a shoulder 344 is formed around the exterior face 342A. This shoulder 344 may ride on a corresponding shoulder of the second frame 306, so that the cylindrical shell 342 can rotate relative to a vertical axis Y.

FIG. 5 shows that cylindrical shell 342 is not fully closed, i.e., there is a gap G between two edges 346A and 346B of the shell. This gap G is calculated in such a way that it corresponds to the opening 306B formed in the chamber 306A, as illustrated in FIGS. 4A and 4B. The reason for this configuration is that the second gripping device 338 provides a strong element, when in the closed position as shown in FIGS. 3 and 4B, against which the first gripping device 322 presses the grasped tool 301. In other words, while the first gripping device 322 presses with first element 324, along axis X in FIG. 3, against tool 301, the second gripping device 338 offers a hard surface (the shell 342) against which the tool is pressed. Note that the shell 342 is fully retracted inside the second frame 306 in the open position illustrated in FIG. 4A (i.e., the gap G of the shell 342 is aligned with the opening 306B of the chamber 306A) while in the closed position, the shell 342 has been rotated by the motor 332, through wheel 334, and the gap G is now hidden inside the second frame 306 as illustrated in FIG. 4B and the shell 342 closes the opening 306B in the second frame 306.

A thickness of the shell 342 is made to be smaller than a clearance between the tool 301 and the panel that holds the tool so that the gripper mechanism 300 is capable of rotating the shell behind the tool 301 for grabbing it. FIG. 4B shows the first and second gripping devices 322 and 338 in contact with each other as there is no tool grabbed between them. Also note that shell 342 may be made of a material having a high adherence or a coating or material 348 having a high adherence may be partially deposited inside the shell, where the tool contacts the shell as shown in FIG. 4B.

While the figures show the motor 312 being placed on a side wall of the first frame 304 and the motor 332 being placed on or next to another side wall of the first frame 304, those skilled in the art would understand that these locations are exemplary and the motors may be placed at other locations along the body 302.

The gripper mechanism 300 is designed such that the second actuator mechanism 330 produces a rotational motion around the Y-axis. This motion moves the geared cylindrical shell part 342 to close the circular grasp region (opening 306B) and introduces the needed contact surface with the tool. The first actuator mechanism 310 acts on the linear slider 314, which is connected to the first gripping device 322, and pushes the tool 301 against the cylindrical shell part 342 so it is jammed.

The gripping force acts directly in the z-direction of the gripper mechanism. Assuming that the gripper mechanism 300 is aligned with the last joint of the robotic arm 206 (see FIG. 2), the force generated by the gripping mechanism also acts along the z-axis of the manipulator's Cartesian coordinate system, which makes the control strategy easier. The circular design (shell 342) increases the effective gripping space while limiting the overall width of the gripper mechanism, which meets the constraints on the horizontal clearance to avoid collision with neighboring tools and maximize accessibility.

The forces and torques acting on the grasped tool can vary depending on the tool approach strategy and tool orientation. The external torques acting on the tool throughout the manipulation process are also affected by the tool orientation with respect to the gripper mechanism origin. The maximum force occurs when the first gripping device 322 is in full alignment and contact with the tool 301. This happens when the pitch θ and roll φ angles are close to zero. The applied grip force is also affected by the shift in attitude. Thus, the applied force may be written as:

$$F_\theta = F\cos(\theta), F_\varphi = F\cos(\varphi). \tag{3}$$

The proposed gripping mechanism 300 eliminates the need for a perfect alignment with the tool, which makes it less sensitive to attitude offset. The gripping mechanism accounts for this deviation without considering complex approach algorithms and feedback systems with high accuracy.

For the wrench example discussed above, the front and back faces of the wrench form the largest portions of the total gripping surface. When the gripper mechanism is in closing transition, i.e., shell 342 is rotating to close the opening 306B and the first gripping device 322 is approaching the shell 342, two surfaces with small curvatures are in physical contact with the tool, the surface of element 324 and the surface of shell 342. These two surfaces may be covered with materials 326 and 348 (see FIGS. 3, 4B and 5) that improve the grasp task. The first layer 326 is a simulated sponge that provides the properties of softness to reduce the impact on the actuator mechanism in case of a sudden change of torque and resilience to retain its form under variable applied forces. This layer allows jamming the gripped tool in a full 360° envelop covering all the tool sides, which contributes to securing the grip further. The second layer 348 of the covering material, which is also in direct contact with the tool surface, may be made of silicon carbide coating (SiC) to provide a high surface friction between the gripper mechanism and the tool surfaces. In one application, the materials of the two layers 326 and 348 may be reversed.

The circular design of the second gripping device 338 shown in FIGS. 3 to 5 is based on the idea of containment within the cylindrical shell 342 before applying the grip force F by the first gripping device 322, which helps in meeting the depth constraint for grasping the tool. This configuration of the gripping mechanism allows to grasp the tool with up to 10 mm of clearance between the tool and the panel.

In one application, a contact surface of the first gripping device 322 is equipped with a touch sensor 327 as shown in FIG. 4A. Touch sensor 327 is connected to controller 350 and based on its measurements, the controller is capable of determining an engagement with the tool, which helps in the autonomous operations of the gripping mechanism. A contact signal from touch sensor 327 may also be used to stop the first actuation mechanism 310.

When the first and second gripping devices 322 and 338 are engaged, i.e., in the closed position as illustrated in FIG. 4B, only one actuator mechanism (the first actuator mechanism 310) is continuously active while the gripper mechanism is closed. The second actuator mechanism 330, which controls the cylindrical shell 342 is only active for a few seconds after reaching the gripping position (closed position in FIG. 4B), when the tool is inside the grasping region. After a couple of seconds, the second actuator mechanism 330 goes to an idle state, which is maintained until an open command is initiated by the controller 350. This arrangement reduces the overall power consumption of the gripper mechanism by operating with one actuator while maintaining a firm grip on the tool.

In one application, the motor's load feedback mechanism allows to apply a variable grip force based on an external torque feedback measured by the robotic arm 6-axes force/torque sensor 352 (see FIG. 3). The current drawn by the first actuator mechanism 310 can be reduced or increased as needed, which further contributes to limit the power consumption of the gripper mechanism.

The gripper mechanism 300 discussed in the previous embodiments may have various other components, which are now discussed. Note that these components may be optional. These components are related to sensing and vision capabilities and how this system is integrated with other robotics systems.

Figure 6:
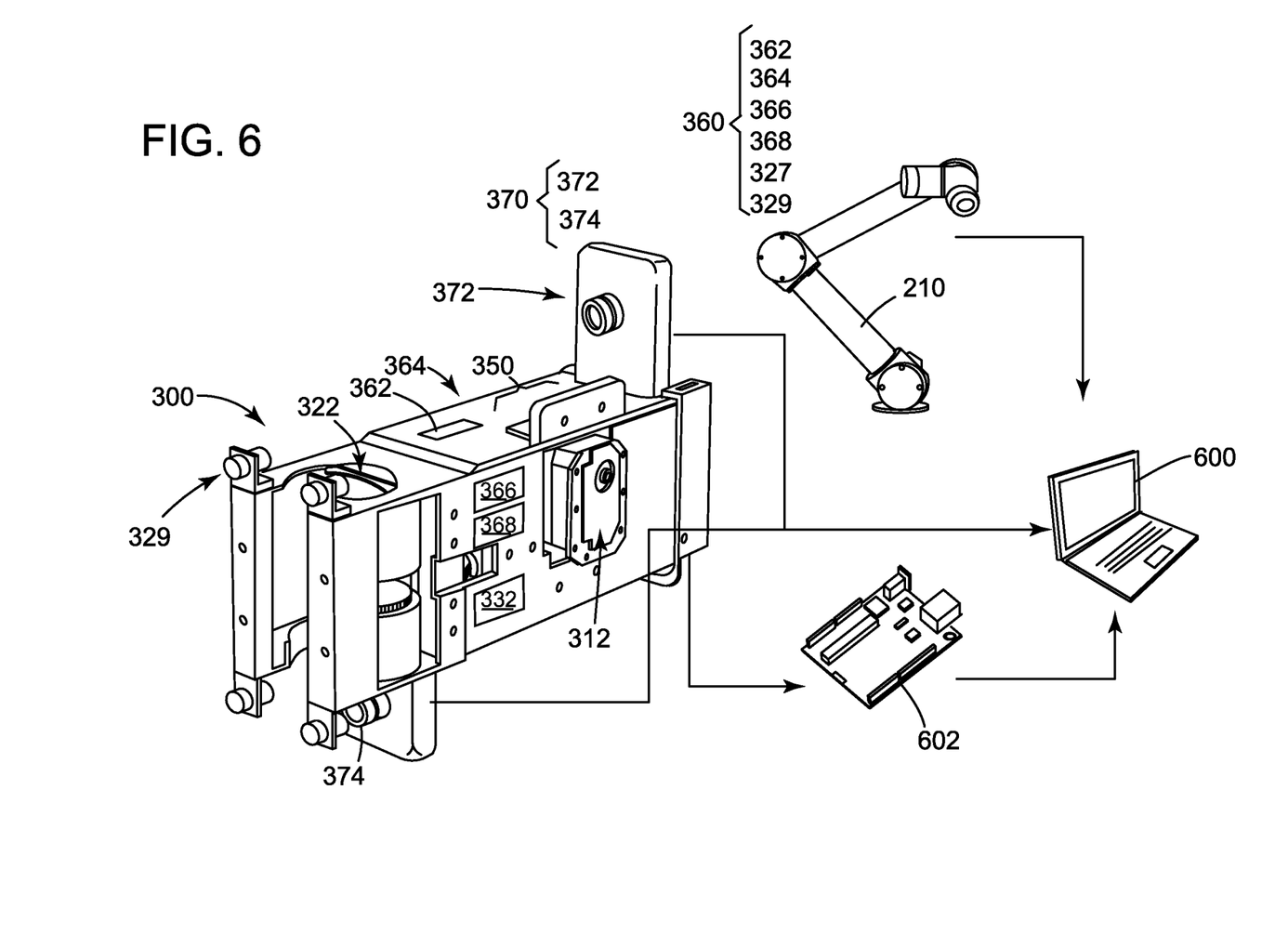
FIG. 6 shows a gripper mechanism integrated with a robotic arm and control mechanism.

In one embodiment, a feedback module 360 is adding inertial measurement, servo feed-back and tactile sensing. The gripper mechanism 300 is equipped, as shown in FIG. 6, with an electronic 9-axis inertial measurement unit (IMU) 362, which may include an accelerometer, gyroscope and/or magnetometer and an Extended Kalman Filter (EKF) estimator 364 for the Euler angles. This is a direct embedded attitude measurement. Two motor (or servo) related feedback circuits 366 and 368 are present for measuring the current servo position and load. These circuits are connected to the motors 312 and 332 and also to controller 350. Note that these units are schematically illustrated in FIG. 6. The current position of the servo is an indication of the tool size or tool thickness, in addition to the transition between the closed and open states. The load feedback mechanism 368 provides an indication about the grip force, which is useful for varying the force grip and adapting to the external torque effects.

Tactile sensing may be embedded in two locations. The first touch sensor 327 has been previously discussed with regard to FIG. 4A, and it is embedded in the part 326 attached to the linear slider 314 that jams the tool 301. This sensor provides an indication about the tool touch and engagement. The second form of tactile sensing (sensor 329) may be embedded in the corners of the gripper's edge, as shown in FIG. 6. These sensors are not utilized for the gripper mechanism 300, but rather they are used for the accurate alignment of the gripper mechanism 300 with the panel from FIG. 1.

A vision module 370 may include two serial cameras 372 and 374 embedded for vision feedback. The first camera 372 is used for tool detection and classification while the second camera 374 is used for tool alignment with respect to the gripper mechanism 300 and robotic arm 210.

The full robotics system 210 runs on a central computer 600 that communicates with all subsystems, including the gripper mechanism 300. An interface with the main CPU may be implemented using a serial connection. All hardware components are connected to a microcontroller module 602 with various needed interfaces such as, digital and analog I/O, I2C, USB and RS485.

The software interface may include two layers: a hardware layer and a system layer. The hardware layer is implemented locally, on the microcontroller module 602 for the purpose of reading signals coming from the hardware devices (e.g., sensors, gripper mechanism, etc.) and writing the data to output devices. It acts as a bridge between the system layer and the hardware, by processing the data from sensors to meaningful feedback and converting the control signals to hardware commands. The system layer may be built utilizing the Robotics Operating Systems (ROS) tools (see Quigley), which simplifies the integration with other subsystems (robotic manipulator, sensors, mobile robots) due to its modular nature.

The full gripper system and integration with the main CPU and the robotic arm is shown in FIG. 6. The control algorithm is developed using ROS where all hardware modules including the gripper mechanism are integrated. This approach introduces flexibility in the system and makes the addition or removal of devices (other types of servos) or sensors (sonars or laser range finders) easier.

Figure 7:
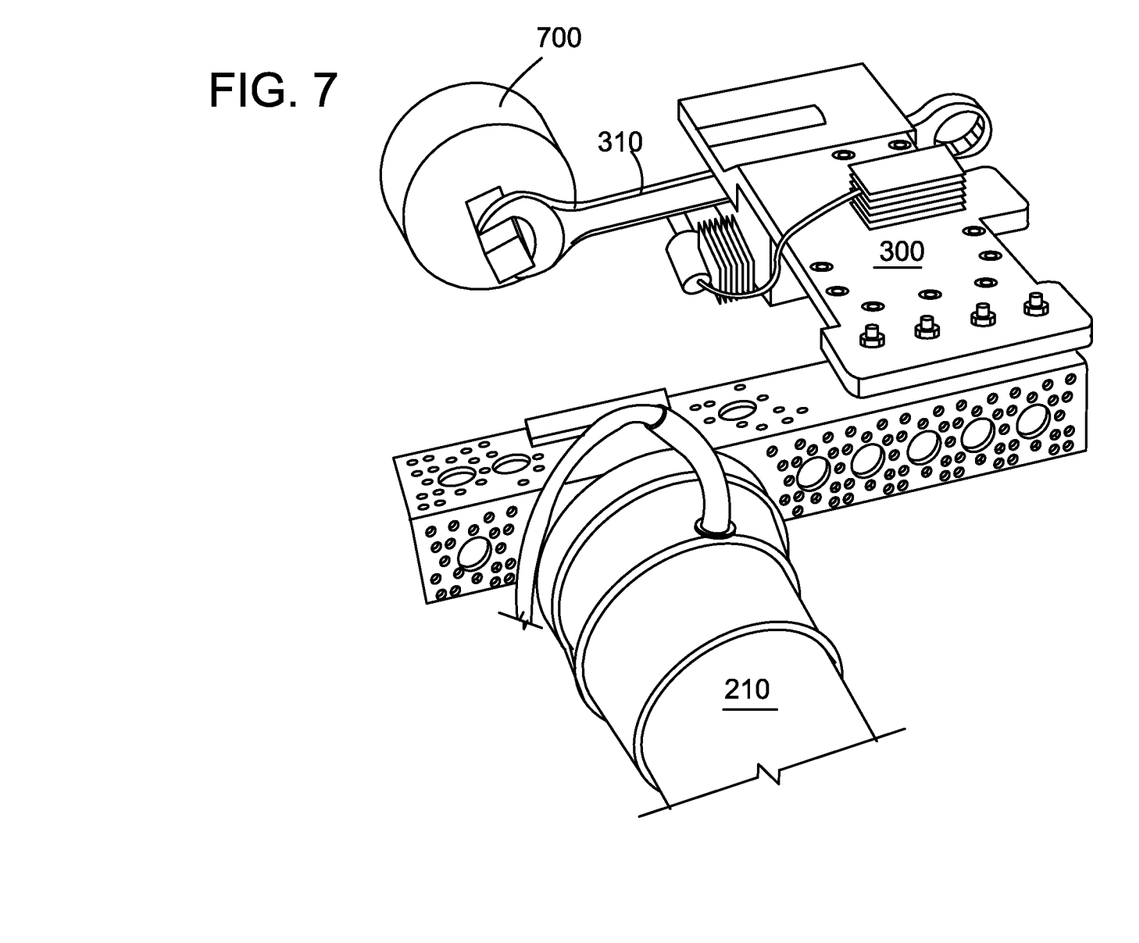
FIG. 7 shows the gripper mechanism grabbing a wrench and actuating a valve.

FIG. 7 shows the robotic arm 210 manipulating the gripper mechanism 300 for gripping a tool 301 and rotating a valve 700 with the tool.

Figure 8:
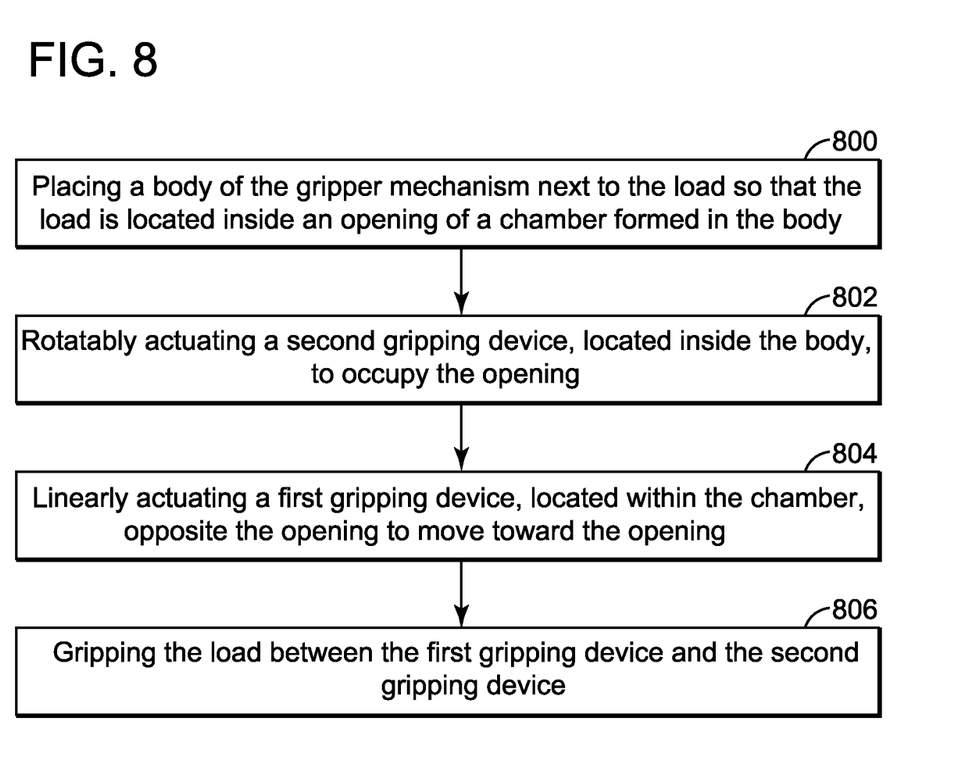
FIG. 8 is a flowchart of a method for using the gripper mechanism.

A method for gripping a tool with the gripper mechanism 300 is now discussed with regard to FIG. 8. The method includes a step 800 of placing a body 302 of the gripper mechanism 300 next to the load 301, so that the load is located inside an opening 306B of a chamber 306A formed in the body, a step 802 of rotatable actuating a first gripping device 338, located inside the body 302, to occupy the opening, a step 804 of linearly actuating a second gripping device 322, located within the chamber 306A, opposite the opening 306B to move toward the opening, and a step 806 of gripping the load between the first gripping device and the second gripping device.

The disclosed embodiments provide methods and mechanisms for grasping a tool. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

A. Sintov, R. Menassa and A. Shapiro, "A gripper design algorithm for grasping a set of parts in manufacturing lines". Mechanism and Machine Theory 105, pp. 1-30, 2016.
D. Roy, "Development of novel magnetic grippers for use in unstructured robotic workspace". Robotics and Computer-Integrated Manufacturing 35, pp. 16-41, 2015.
A. Zaki, A. Soliman, O. Mahgoub and A. El-Shafei, "Design and imple-mentation of efficient intelligent robotic gripper". The 2010 International Conference on Modelling, Identification and Control (ICMIC), pp. 710-716. IEEE, 2010.
T. Vittor, H. Staab, S. Breisch, S. Soetebier, T. Stahl, A. Hackbarth and S. Kock, "A flexible robotic gripper for automation of assembly tasks: A technology study on a gripper for operation in shared human environments". IEEE International Symposium on Assembly and Manufacturing (ISAM), pp. 1-6. IEEE, 2011.
R. Maruyama, T. Watanabe and M. Uchida, "Delicate grasping by robotic gripper with incompressible fluid-based deformable fingertips". IEEE/RSJ International Conference on Intelligent Robots and Systems (IROS), pp. 5469-5474. IEEE, 2013.
F. Chen, F. Cannella, C. Canali, T. Hauptman, G. Sofia and D. Caldwell, "In-hand precise twisting and positioning by a novel dexterous robotic gripper for industrial high-speed assembly". IEEE International Conference on Robotics and Automation (ICRA), pp. 270-275. IEEE, 2014.
S. Song, C. Majidi and M. Sitti, "Geckogripper: A soft, inflatable robotic gripper using gecko-inspired elastomer micro-fiber adhesives". IEEE/RSJ International Conference on Intelligent Robots and Systems (IROS 2014), pp. 4624-4629. IEEE, 2014.
M. Quigley, K. Conley, B. Gerkey, J. Faust, T. Foote, J. Leibs, R. Wheeler, and A. Y. Ng. "ROS: an open-source Robot Operating System". In ICRA workshop on open source software, vol. 3, no. 3.2, p. 5. 2009.

What is claimed is:

1. A gripper mechanism for gripping a load, the gripper mechanism comprising:
   a body having a chamber that is open;
   a first actuator mechanism attached to the body and configured to linearly move a first gripping device within the chamber;
   a second actuator mechanism attached to the body and configured to rotate a second gripping device within the chamber to close the chamber;
   a torque sensor located on the body and configured to detect a torque; and
   a load feedback mechanism configured to control the first actuator mechanism to apply a variable force on the load, based on the torque detected by the torque sensor,
   wherein a translation of the first gripping device and a rotation of the second gripping device result in gripping the load within the closed chamber, and
   wherein the first and second gripping devices are configured to apply the torque to the load.

2. The gripper mechanism of claim 1, wherein the first actuator mechanism comprises:
   a motor; and
   a linear slider that is translated by the motor,
   wherein the first gripping device is attached to an end of the linear slider.

3. The gripper mechanism of claim 2, wherein the body includes a first frame and a second frame.

4. The gripper mechanism of claim 3, wherein the linear slider extends through the first frame into the second frame, in the chamber formed within the second frame.

5. The gripper mechanism of claim 1, wherein the second actuator mechanism comprises:
   a motor that rotates the second gripping device.

6. The gripper mechanism of claim 1, wherein the second gripping device includes a cylindrical shell having a gap.

7. The gripper mechanism of claim 6, wherein the gap corresponds to an opening of the body.

8. The gripper mechanism of claim 6, wherein the cylindrical shell has plural teeth that mate with corresponding teeth of a motor that rotates the cylindrical shell.

9. The gripper mechanism of claim 1, wherein the second gripping device has an open position, when a gap in the second gripping device is aligned with an opening in the body, and a closed position, when the gap is within the body and the second gripping device occupies the opening in the body.

10. The gripper mechanism of claim 1, wherein the body and the second gripping device define the chamber within the body.

11. The gripper mechanism of claim 10, wherein the first gripping device has a closed position for which the first gripping device extends through the chamber.

12. A gripper mechanism for gripping a load, the gripper mechanism comprising:
   a body having a chamber, the chamber having an opening for receiving the load;
   a first gripping device located within the chamber, opposite the opening, during an open position;

a second gripping device located within the body, during the open position;

a torque sensor located on the body and configured to detect a torque; and a load feedback mechanism configured to instruct the first gripping device to apply a variable force on the load, based on the torque detected by the torque sensor, wherein a translation of the first gripping device within the chamber and a rotation of the second gripping device within the chamber result in closing the opening of the chamber and gripping the load between the first gripping device and the second gripping device, during a closed position, and wherein the first and second gripping devices are configured to apply the torque to the load.

13. The gripper mechanism of claim 12, wherein the first gripping device is located adjacent to the opening during the closed position.

14. The gripper mechanism of claim 13, wherein the second gripping device occupies the opening during the closed position.

15. The gripper mechanism of claim 12, further comprising:

a first actuator mechanism attached to the body and configured to linearly move the first gripping device; and a second actuator mechanism attached to the body and configured to rotate the second gripping device.

16. The gripper mechanism of claim 15, wherein the first actuator mechanism comprises:

a motor; and a linear slider that is translated by the motor, wherein the first gripping device is attached to an end of the linear slider.

17. The gripper mechanism of claim 16, wherein the second actuator mechanism comprises:

a motor that rotates the second gripping device.

18. The gripper mechanism of claim 12, wherein the second gripping device includes a cylindrical shell having a gap.

19. The gripper mechanism of claim 18, wherein the gap corresponds to the opening of the body.

20. A method for gripping a load with a gripper mechanism, the method comprising:

placing a body of the gripper mechanism next to the load so that the load is located inside an opening of a chamber formed in the body;

rotatably actuating a first gripping device, located inside the body, to occupy and close the opening;

linearly actuating a second gripping device, located within the chamber, opposite the opening, to move toward the load; and gripping the load between the first gripping device and the second gripping device, wherein the gripper mechanism includes:

a torque sensor located on the body and the torque sensor is configured to detect a torque, and a load feedback mechanism configured to instruct the first gripping device to apply a variable force on the load, based on the torque detected by the torque sensor, and wherein the first and second gripping devices are configured to apply the torque to the load.

* * * * *